United States Patent Office 3,176,996
Patented Apr. 6, 1965

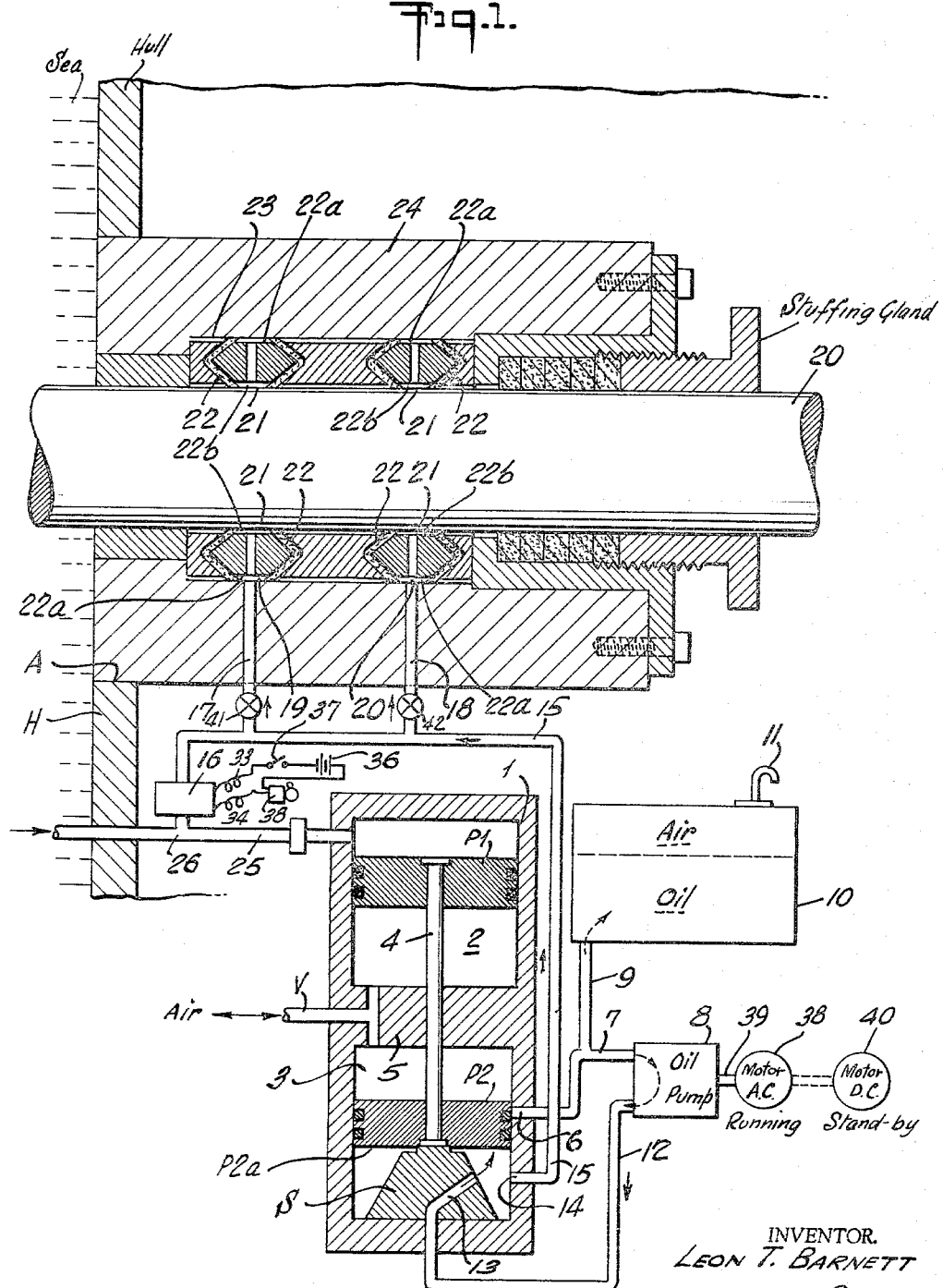

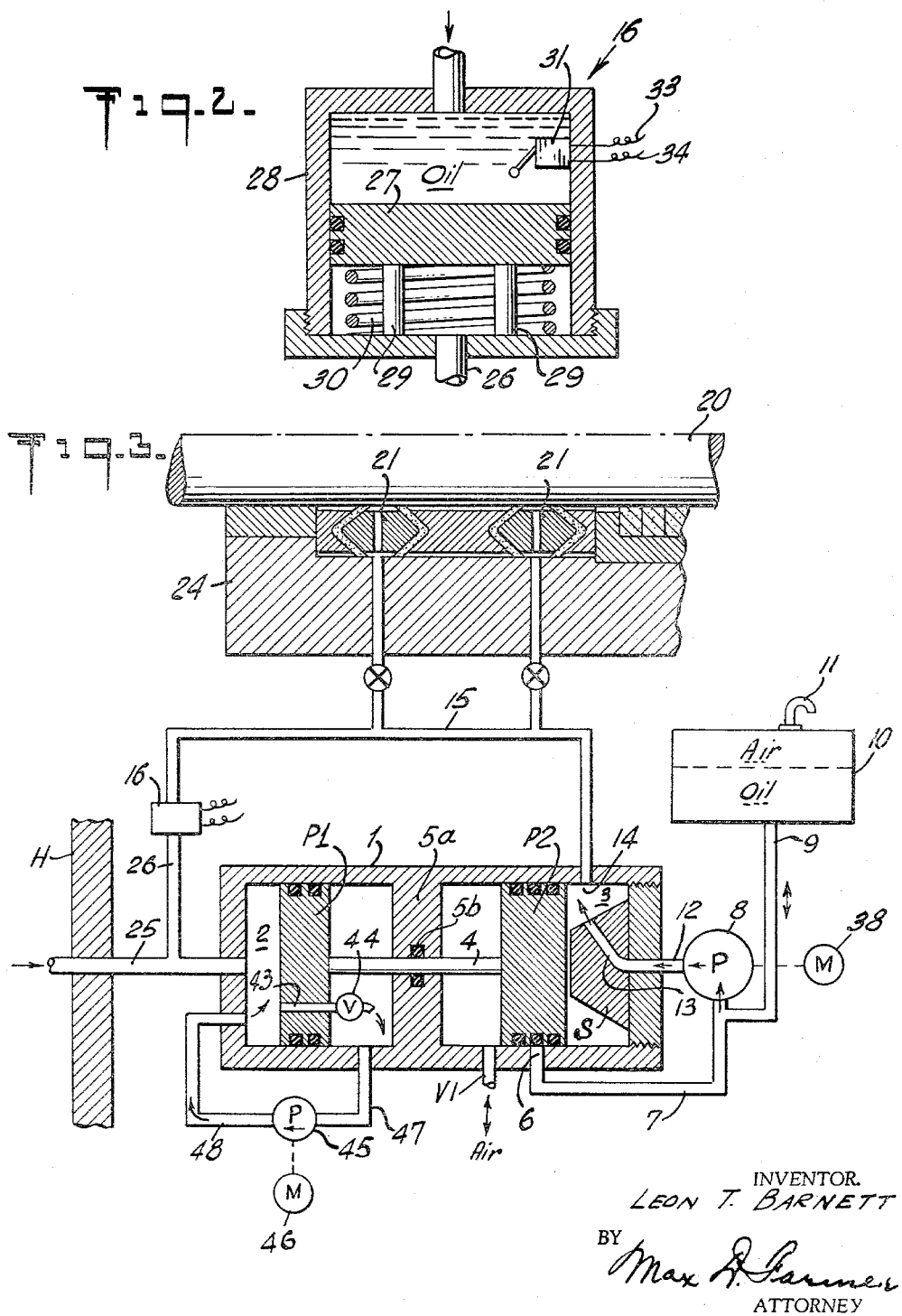

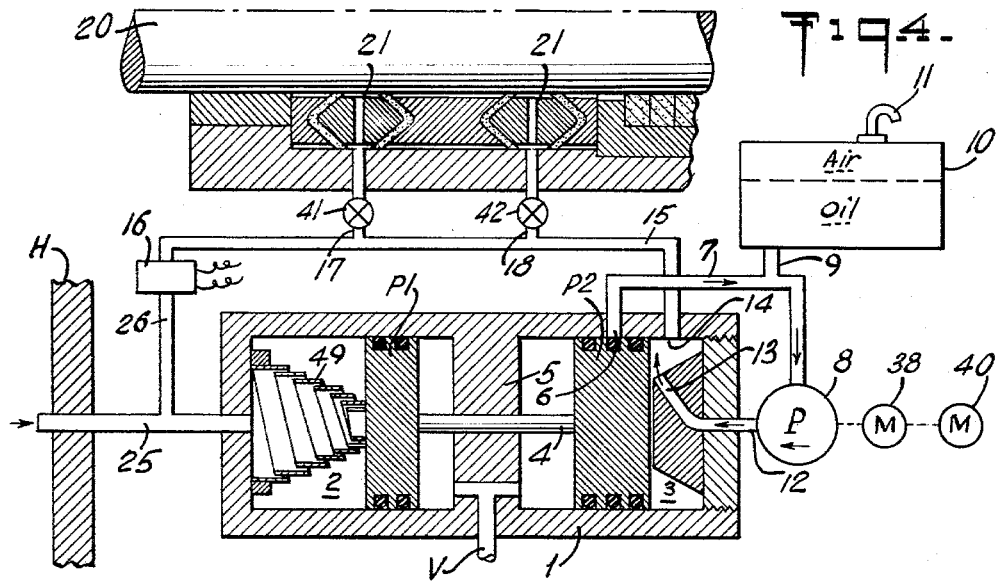
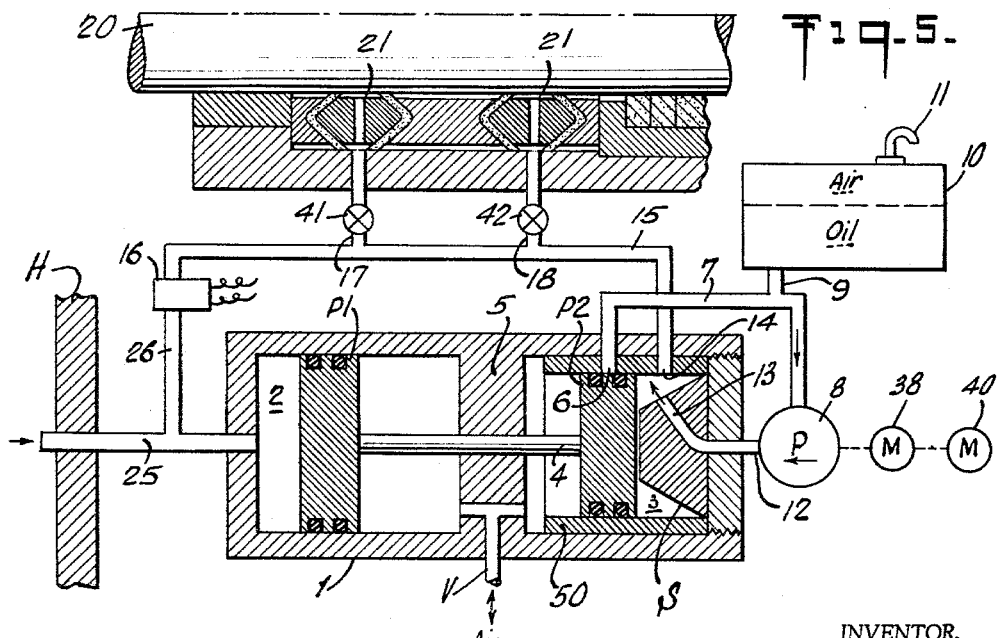

3,176,996
OIL BALANCED SHAFT SEAL
Leon Truman Barnett, Fort Hill Road, Groton, Conn.
Filed Oct. 12, 1962, Ser. No. 230,299
10 Claims. (Cl. 277—2)
(Granted under Title 35, U.S. Code (1952), sec. 266)

The invention described herein may be manufactured and used by or for the Government of the United States of America for governmental purposes without the payment of any royalties thereon or therefor.

This invention relates to seals for shafts, and particularly to seals for shafts in ships that pass through a hull wall below the water line and where the sea water on the outside of the ship's hull attempts to enter the ship by creeping along the shaft where it passes through the hull wall.

In many ship constructions the seals for some shafts, such as for propeller shafts, are located in a part of a ship where access to the seals is difficult in order to observe the start of leakage along the shaft. Hence it is very important that the life of such seals and their full effectiveness be prolonged as far as possible, and in event of leakage when a ship is at sea and far from a service port, simple actions may limit such leakage until it is convenient or practical to effect suitable repairs to or replacement of such seals. In submarines, the seal must be effective at different depths in the sea where the sea water pressure varies considerably.

Objects of this invention are to provide a novel means for sealing the passage for a shaft that extends through the hull of a ship below the water line on the hull, with which a liquid lubricant may be used to lubricate the seal and progressively and automatically increase the sealing action of the seal with increases in pressure of the sea water attempting to pass the seal, which will automatically maintain a pressure on the liquid lubricant in the seal by a selected amount at all times in excess of the sea water pressure which is attempting to pass the seal, which will signal an alarm automatically should the pressure on the lubricant in the seal fall below a selected excess over the pressure of the sea water attempting to pass the seal, with which an alternative but similar seal may be put into action on said shaft as a substitution for a leaking seal, by simple and convenient controls, with which such controls may be remote from the seals and which seals are relatively simple, practical, dependable, and inexpensive.

Other objects and advantages will be apparent from the following description of some examples of the invention, and the novel features will be particularly pointed out hereinafter in connection with the appended claims.

In the accompanying drawing:

FIG. 1 is a cross-sectional elevation and schematic diagram of apparatus representing one example of the invention;

FIG. 2 is a sectional elevation of the switch of the automatic alarm signal that forms a part of the apparatus of FIG. 1, but on a larger scale;

FIG. 3 is an elevation, partly in section and partly schematic, of a modification of part of the apparatus shown in FIG. 1;

FIG. 4 is an elevation, partly in section and partly schematic, of another modification of part of the apparatus shown in FIG. 1; and FIG. 5 is similar to FIGS. 3 and 4 but illustrates still another example of the invention.

Referring first to the example of the invention illustrated in FIGS. 1 and 2, the control is provided in a closed casing or housing 1 which has two end chambers 2 and 3. A piston P1 is provided in the chamber 2 and another piston P2 is provided in the chamber 3, and both pistons are firmly coupled together by a rod 4 which passes through a partition wall 5 that separates the end chambers 2 and 3. These pistons have any suitable piston rings or O-rings in their peripheries as usual on pistons. Those two pistons, so coupled together, can reciprocate as a unit or element in the housing or casing 1. A stop S is provided on the inside face of the end wall of the end chamber 3 to limit the movement of the two piston unit or element toward the closed end of this chamber 3, and that face area of this stop which is engaged by the piston P2 is made very small, as shown, in order that when a liquid lubricant under pressure is admitted into the end of chamber 3 it will exert pressure on practically the entire under face P2a of the piston P2. The casing 1 in this example of the invention is disposed vertically, so that the pistons P1 and P2 will move vertically, and the lower end of the chamber 2 and the upper end of the chamber 3 are connected together and vented by vent V so that there will be little or no back pressure resisting movements of the pistons P1 and P2 except atmospheric pressure on the under face of the piston P1 and the upper face of the piston P2. A side wall of the chamber 3 is provided with a port 6 which is normally closed or covered by the piston P2 when the latter is in its lowermost position, as shown in FIG. 1. This port 6 is connected by a pipe or conduit 7 to the intake side of an oil pump 8. A branch pipe 9 connects the pipe 7 to the lower part of an oil tank or reservoir 10 for a liquid lubricant, which tank is vented to air at its top by a vent 11.

The delivery port or outlet of the pump 8 is connected by a pipe or conduit 12 to the lower end of the chamber 3, such as through a port or passage 13 in the stop. The lower part of the chamber 3, below the lowermost position of the piston P2, has another port 14 which is connected by a pipe or conduit 15 to a pressure alarm device 16, but before this pipe 15 reaches the device 16 it has two branches 17 and 18 which lead respectively to chambers 19 and 20 in which annular, "Chevron" type seals are provided around the shaft or member 20 that passes through an aperture A of the hull wall H of a ship and along which sea water will tend to pass or creep until prevented by the seals. These seals are in annular spaces around the shaft 20, and the "Chevron" rings 22 are annular, but V-shaped in cross-section, with the concave or cup faces of the rings in cross-section facing one another in each seal. Annular spacers 21, usually of bronze, are disposed between the seal rings to keep the rings 22 separated, but the spacers 21 do not entirely fill the space between the "Chevron" rings 22 and leave concentric annular spaces 22a and 22b to be occupied by the liquid lubricant that is supplied to the outer one 22a of the concentric spaces. The spacers have small passages therethrough to pass the lubricant from the outer annular spaces 22a to the inner annular spaces 22b. These annular spaces 22a and 22b leave the edges of the rings 22 free to flex and engage with the periphery of the shaft and the wall 23 of the open ended tubular member or bearing 24. The pressure of lubricant on these free edges forcibly presses the edges into firm contact with the shaft and passage wall. There are two of such seals spaced apart in tandem along the shaft 20, one only being necessary for use at a time, so that if one such seal should start to leak its liquid lubricant or lubricating oil and pass sea water that tends to creep along the shaft, the pressure on it can be cut off and the other seal made effective. Thus if such leakage in one seal should occur while the ship is far at sea and not near a repair base, the ship's engineer can cut off the supply of liquid lubricant to the leaky seal and cut in the other seal to receive the liquid lubricant or lubricating oil. Sea water from the exterior of the hull below the water line is conducted by pipe 25 through the hull wall into the upper end of the upper chamber 2 so as to exert the full pressure of the sea water upon the upper face of the piston P1. The pipe 25 has a branch 26 which is connected to the pressure alarm 16 at the opposite side of the alarm from the connection of pipe 15 thereto.

The pressure alarm devices 16 are available in the market, but one example of an alarm that can be used is illustrated in FIG. 2, in which a piston 27 is disposed for reciprocation in a closed casing 28, the pipe 15 being connected to and communicates with the interior of the casing 28 at the top thereof. The branch pipe 26 is connected to and communicates with the interior of the casing 28 at the bottom thereof, so that the liquid lubricant pressure is continuously applied to the upper face of the piston 27 and the sea water pressure is continuously applied to the lower face of the piston 27. Stops 29 are provided on the bottom of the interior of casing 28 to limit the downward movement of piston 27. A helical compression spring 30 is confined in the lower part of casing 28 below piston 27 and is under selected substantial compression by the piston 27 when the latter engages the stops 29. An electric switch 31 is disposed within casing 28 above piston 27 and has an operating arm 32 in the path of the piston 27 when the latter moves upwardly, to close a circuit between wires 33 and 34 of an alarm circuit (FIG. 1) in which the switch is included in series with an electric bell or buzzer 35, a battery 36 and a manually operable switch 37.

The pump 8 is continuously driven by an A.C. motor 38 through a detachable coupling to a shaft 39, and a stand by D.C. motor 40 is also detachably coupled to the shaft 39 so that if for any reason the A.C. motor fails to operate, the pump may be driven by the motor 40 powered by batteries. The pump 8 is small, so that only a small powered motor 38 or 40 is required, and hence the D.C. motor could be driven by a storage battery if the ship's A.C. power should be incapacitated or failed. The reservoir 10 is only partially filled with a liquid lubricant or oil which serves to keep the pump supplied at all times with the liquid lubricant or lubricating oil. The pump 8 is of any suitable construction and, for example, may be a centrifugal pump or a positive displacement pump.

The operation of the example illustrated in FIGS. 1 and 2 is as follows:

The oil pump 8 is operated continuously under the power of the motor 38 and it draws lubricating oil or liquid lubricant from the tank or reservoir 10 through pipes 7 and 9, and delivers it under pressure through pipe 12 and passage 13 to the chamber 3 of the regulating valve below piston P2. At the same time sea water enters chamber 2 above piston P1 and exerts a downward pressure on the coupled pistons and tends to hold the pistons in their lower positions determined by engagement of piston P2 with stop S. As the liquid lubricant or oil continues to enter the chamber 3 below piston P2, the pressure on the lower face of the piston will build up and when it is sufficient to overcome the downward pressure of the sea water on the top of piston P1 plus the weight of the coupled pistons, it will move the coupled pistons upwardly and displace some of the sea water from chamber 2. During this upward movement of the coupled pistons, the lower piston, which has been covering port 6 will uncover it, whereupon some of the liquid lubricant below piston P2 in chamber 3 will escape through port 6 and pass through pipe 7 back to the intake side or port of the pump. At this time the liquid lubricant or oil will circulate from the pump through chamber 3 and back to the pump, and hold the coupled pistons in their upper positions, with port 6 uncovered just sufficiently to pass any oil or lubricant in excess of that necessary to keep the coupled pistons elevated, that is, to maintain in the chamber 3 below piston P1 a pressure equal to that of the sea water plus the weight of the coupled pistons. The weight of the coupled pistons should correspond to the excess pressure by which the pressure of the liquid lubricant is desired above the pressure of the sea water at any time. If the weight of the coupled pistons is inadequate to give this desired excess pressure of the liquid lubricant over the sea water pressure, the area of the under face of the lower piston P2 can be made enough smaller than the upper face area of piston P1 to provide the greater pressure then necessary to overcome the sea water pressure then necessary to cause the coupled pistons to move upwardly until port 6 is partially uncovered. In practice, the pump 8 may be set to deliver oil to the under face of piston P2 under a pressure of about 30 pounds per sq. in. (p.s.i.) above the maximum sea water pressure expected through the pipe 25, which oil pressure is supplied to the space between the chevron rings of the seals. The upper face of the piston P1 and the lower face of piston P2 have relative sizes that with the weight of the coupled pistons the liquid pressure acting upwardly on the lower face of piston P2 will equal the sea water pressure acting downwardly on the coupled pistons plus a selected excess pressure such as about 30 p.s.i. for example. When the liquid upward pressure is in excess of the sea water pressure by more than the selected excess pressure, such as 30 p.s.i., the coupled pistons will move upwardly until the port 6 is uncovered enough to pass just enough liquid lubricant back to the pump to keep the coupled pistons in their upper positions. As the sea water pressure on the hull varies, so will the pressure on the seals along the shaft, but always with the pressure on the seals greater than that of the sea water by the selected excess pressure desired. This maintains a continuous pressure on the seals that is always in excess of sea water pressure by a selected amount such as, for example, by an excess of 30 p.s.i.

Normally the lubricant pressure is supplied only to one of the seals, such as between one pair of chevron rings and if that seal begins to leak, the lubricant is delivered to the other seal. This is made possible by having manually operable valves 41 and 42 in the pipes 17 and 18, respectively, so that the pipe to the leaky seal can be shut off and the pipe to the other seal opened.

If and when the seal in use begins to leak, or pass sea water, the liquid pressure in pipe 15 will fall and if it falls below the selected excess of pressure over that of the sea water, the signal alarm circuit will be activated and close an electric circuit through the alarm signal 35. This is because when the oil pressure on the top of piston 27 falls enough, the sea water pressure on the under face of piston 27 plus the pressure of the spring 30 will move the piston upwardly until it engages and operates switch 31 and causes activation of signal device 35. The attendant then operates one of the valves 41 or 42 to the leaky seal to close the liquid lubricant flow or pressure to that seal, and then open the valve in the pipe 17 or 18 leading to the other non-leaky and previously unused seal.

In the example of the invention illustrated, in FIG. 3, the construction is generally similar to that disclosed in FIGS. 1 and 2 except that the valve casing is disposed to have the pistons P1 and P2 move generally horizontally, in which case there is no weight bias to urge the coupled pistons into their retracted positions. This makes it necessary either to reduce the face area of piston P2 which is exposed to pressure from the pump, or provide other means for providing the bias. In this example, a definite added bias is provided, and the parts in this example that have corresponding parts in FIGS. 1 and 2 are designated by the same reference numerals in FIG. 3. In FIG. 3 the part of chamber 3 between the piston P1 and a partition wall 5a across the interior of the casing is vented to air by port V1, and an O-ring or other seal 5b is provided in the partition wall 5a around the coupling rod 4. The piston P1, in this example, is modified by having a small passage 43 from face to face of the piston, controlled by a pressure relief valve 44 that opens toward the partition wall 5a under the selected pressure differential such as of about 30 p.s.i. A small pump 45, operated continuously by a small motor 46, has its intake port connected by pipe 47 to the space between piston P1 and wall 5a, and its delivery port is connected by a pipe 48 to the end of the chamber 2 into which sea water is supplied through pipe 25. This pump 45 creates a suction in the casing 1 at the face or side of piston P1 opposite from that upon which sea water pressure is applied, and this suction will create a pressure differential on opposite faces of piston P1 equal to that for which the pressure relief valve 44 is set to open and which pressure differential may, for example, be about 30 p.s.i. This pressure differential on piston P1 urges the coupled pistons against the stop S and when the pressure of the liquid lubricant or lubricating oil from pump 8 on the right hand face of piston P2 exceeds the sea water pressure by that pressure for which valve 44 is set to open, the coupled pistons will move until port 6 is uncovered to maintain a pressure on the seals of about 30 p.s.i. over that of the sea water pressure in pipe 25 at any time. Otherwise the operation is the same as described for FIGS. 1 and 2.

In FIG. 4 which illustrates another example of the invention, the main difference over FIG. 1 is that the casing 1 is disposed to have the pistons P1 and P2 reciprocate horizontally, and to give the extra bias on piston P1 of say about 30 p.s.i. in place of the weight of the coupled pistons, a volute coiled ribbon spring 49 is disposed in chamber 2 of casing 1 in the space where sea water pressure is applied against piston P1 and under a selected degree of compression between piston P1 and the adjacent end wall of chamber 2. This adds the stress pressure of the spring 49 to that of the sea water on piston P1 which must be overcome by the pressure on piston P2 of the liquid lubricant from pump 8. The larger base of spring 49 abuts the end wall of casing 1 in chamber 2 and the smaller end of this spring abuts a face of the piston P1. These volute coiled ribbon springs are well known in the art and are disclosed, for example, in U.S. Patent No. 2,986,666, of May 30, 1961, and British Patent No. 118,-520, to Veritys, Ltd., of September 5, 1918. This makes it possible to place a pressure of lubricant in the seals which will always exceed a varying sea water pressure by the amount of the pressure exerted on piston P1 by the compression pressure of this spring which can, for example, be about 30 p.s.i.

In the example illustrated in FIG. 5, the construction is generally the same as described for FIGS. 1 and 2 except that the piston P2 has a smaller area of its face which is exposed to liquid lubricant pressure from pump 8, and a sleeve 50 is introduced and fixed in the chamber 3 end of the casing to fit the smaller diameter of piston P2. This smaller face area of piston P2 requires a higher pressure per unit face area on it of the lubricant from pump 8 in order to balance the sea water pressure on the larger face area of piston P1. This gives a larger lubricant pressure in the seals than that of the varying sea water pressure on piston P1, which difference in pressure can be, for example, about 30 p.s.i., or whatever pressure differential over sea water pressure is desired in the seals.

In all of the examples the pressure of the liquid lubricant in the seals for the shaft 20 will always exceed the pressure of the sea water attempting to creep along shaft 20 past the seals, by a selected excess or differential pressure, at all times and even while the sea water pressure on the hull is varying. In submarines and the like where the vessel varies in the depth to which it is submerged, such a sealing device which always and automatically maintains this excess in the seals over varying sea water pressure is accomplished in a simple and practical manner requiring a minimum of attention.

It will be understood that various changes in the steps, materials, details and arrangements of parts which have been herein described and illustrated in order to explain the nature of the invention, may be made by those skilled in the art within the principle and scope of the invention as expressed in the appended claims.

I claim:
1. A balanced seal for a member that passes through and is movable in the hull wall of a ship below the water line thereof, where sea water is on the exterior side of said wall, which comprises:
said wall having an aperture therethrough,
a tubular sleeve secured endwise to said wall at and surrounding said aperture, with its passage aligned and communicating with said aperture,
said member passing endwise through said aperture and sleeve and having bearing in said sleeve,
separate annular sealing rings confined in and spaced apart along the passage of said sleeve and being cup-shaped in cross-section, with the concave sides of the cup shapes facing one another,
separate spacer means between said rings for keeping them separated, and means including a pump connected to said space between said rings for continuously supplying to and maintaining in such space between said rings a liquid lubricant under a selected pressure somewhat above the expected maximum pressure of the sea water on said hull wall,
and pressure alarm means in fluid communication with sea water on the exterior side of the hull and with the said space between said rings, for signalling whenever such lubricant pressure between said rings fails to exceed the sea pressure on said hull wall by a selected margin.

2. A balanced seal for a member that passes through and is movable in the hull wall of a ship below the water line thereof, where sea water is on the exterior side of said wall, which comprises said wall having an aperture therethrough, a tubular sleeve secured endwise to said wall at and surrounding said aperture, with its passage communicating with said aperture, said member passing endwise through said aperture and sleeve and having bearing in said sleeve, separate annular sealing rings confined in and spaced apart along the passage of said sleeve and being cup-shaped in cross-section, with the concave sides of the cup shapes facing one another and the edges free and one engaging said sleeve and the other said member, spacer means between said rings for keeping them separated, a casing having a closed chamber, two pistons coupled together in tandem, and disposed in said chamber for reciprocation back and forth therein, conduit means connecting one end of said chamber to the exterior of said hull for conveying sea water to that one end of said chamber, a pump, conduit means connecting the delivery port of said pump to the other end of said chamber and to the space between said rings, a reservoir for a liquid lubricant connected to the intake port of said pump, said casing having a vent for that part of said chamber always between said pistons, motive means for continuously operating said pump to deliver liquid lubricant continuously to said other end of said chamber and exert a pressure on the adjacent piston in opposition to the pressure of seat water against the other of said pistons, and conduit means connecting said other end of said chamber to said reservoir, with its end that opens into said chamber normally covered and closed by the one of said pistons which is at that end of said chamber into which said pump delivers liquid under pressure, while the sea water pressure on the pistons is greater than the pressure from said pump, but uncovered and opened by said one of said pistons which normally covers it when the pressure delivered by the pump exceeds the sea water pressure on the pistons sufficiently to move the pistons against the sea water pressure against them.

3. A seal for a member that passes through a hull wall of a ship below the water line thereof and is movable relatively to said wall, which comprises said wall having an aperture below said water line, an open ended tubular element secured endwise to the interior of said wall, with its passage aligned with and encircling the periphery of said aperture, a pair of annular packing rings, somewhat V-shaped in cross-section, disposed in said passage with their concave surfaces facing one another and in spaced apart relation along said passage, and with the side edges of the rings flexible and engaging against the wall of said passage and the periphery of said member, a hollow casing, an element within and reciprocable in directions endwise of said chamber in piston-like manner, and creating two separate end chambers within the interior of said casing, a conduit connecting one of said end chambers of said casing to the exterior of said hull wall below said water line so as to admit sea water into said one end chamber, pump means connected to the other of said end chambers for delivering thereto a liquid lubricant under pressure and also connected to the space between said rings, said casing having a port opening into said other of said chambers and covered by said element when the latter is nearest to said other of said chambers and uncovered by said element when the latter moves materially toward said one chamber, means connecting said port to the intake part of said pump means, a reservoir for a liquid lubricant or lubricating oil connected to said connecting means, and a motor connected to said pump means for operating it, said element during operation of said pump means being biased toward said other of said chambers by a selected pressure differential over the pressure of said sea water.

4. The seal according to claim 3, wherein said casing is disposed to cause vertical movements of said element, whereby the weight of said element provides at least a portion of said bias.

5. The seal according to claim 3, wherein the surface of said element exposed to lubricant pressure in the other of said end chambers has an area materially less than the area of the surface of said element that is exposed to sea water for providing at least a portion of said bias.

6. The seal according to claim 3, and pressure alarm means in fluid communication with sea water on the exterior of said hull and with the space between said rings, for signaling an alarm whenever the lubricant pressure fails to exceed said sea water pressure by a selected amount.

7. In a ship construction of the type in which a member passes through an aperture in a hull wall below the water line and through a seal employing a pair of annular seal rings of generally V-shape in cross-section arranged oppositely to one another and spaced apart along the member, with the cavities of the V facing one another, the combination therewith of means for continuously delivering to the space between said rings a liquid lubricant under regulatable pressure, and control means in fluid communication with the sea water pressure on the exterior of said hull wall below the water line for regulating said lubricant delivering means to maintain the lubricant pressure between said rings continuously at a selected excess pressure differential over that of said sea water on said hull wall, and alarm signaling means having fluid communication with the exterior of said hull below the water line and the space between said rings for emitting a signal whenever the said lubricant pressure between said rings fails to exceed the said sea water pressure by a selected pressure difference.

8. In a ship construction of the type in which a member passes through an aperture in a hull wall below the water line and through a seal employing a pair of annular seal rings of generally V-shape in cross-section arranged oppositely to one another and spaced apart along the member, with the cavities of the V facing one another, the combination therewith of means for continuously delivering to the space between said rings a liquid lubricant under regulatable pressure, and control means in fluid communication with the sea water pressure on the exterior of said hull wall below the water line for regulating said lubricant delivering means to maintain the lubricant pressure between said rings continuously at a selected excess pressure differential over that of said sea water on said hull wall, and a second seal having pair of spaced apart rings, V-shaped in cross-section similar to those first mentioned above arranged along said member further from said hull wall and also preventing travel of sea water along said member, a branch connection from said lubricant delivering means to the space between said rings of said second seal to deliver thereto some of said lubricant under pressure, means for interrupting the supply of lubricant to each of such seals separately and individually, and alarm signaling means controlled jointly by both said sea water pressure on the exterior of said hull and said lubricant pressure on any seal to which said lubricant under pressure is being delivered, for emitting a signal whenever said lubricant pressure on said any seal fails to exceed the said sea water pressure by a selected pressure difference, whereby upon emission of such a signal an attendant is warned to operate said interrupting means for said any seal to discontinue delivery of lubricant to that seal and establish delivery to the other of said seals.

9. A balanced seal for a member that passes through and is movable in the hull wall of a ship below the water line thereof, where sea water is on the exterior side of said wall, which comprises:

(a) said wall having a tubular boss extending inwardly into the hull with its passage opening outwardly through the hull wall, (b) said member passing endwise through said passage and having bearing in the passage wall adjacent to said hull wall, (c) annular sealing means within said passage, spaced inwardly of the hull from said bearing of said member in said passage, surrounding said shaft and having flexible flanges divergent in a direction inwardly of the hull, and having one of its flanges bearing on said shaft and the other on the wall of said passage, (d) a housing with a chamber having a conduit connecting one end of said chamber to the exterior of said hull and there open to sea water, (e) a power operated pump having an intake port and a delivery port, (f) a conduit connecting said delivery port to the other end of said chamber, (g) a reservoir for lubricant liquid connected to said intake port, (h) a free piston element in said chamber and reciprocatable in said chamber in directions endwise by pressure differentials thereon in the ends of said chamber, (i) a pressure release conduit communicating with said intake port, opening into said chamber between the ends of the chamber and normally closed by said piston element when the latter is at the end of the chamber into which opens the conduit from said delivery port and uncovered when said piston element moves materially away from said other end of said chamber, and (j) means connecting said delivery port to the inner face of said sealing means for continuously delivering lubricant liquid from said pump to the inner face of said sealing means, (k) whereby when oil pressure from said pump on said piston element in one end of said chamber is insufficient to move said piston element against the pressure of the sea water in the other end of said chamber, said pressure release conduit will be closed by said piston element and the full pressure of lubricant liquid from said pump will be delivered against the inner face of said sealing means, and when the pressure on said piston element from said pump is sufficient to move materially said piston element against the sea water pressure in the other end of said chamber, said pressure release conduit will be opened by said piston element sufficiently to return said lubricant from said other end of said chamber by an amount that maintains a selected pressure on said sealing means in excess of the pressure of sea water in said one end of said chamber.

10. The seal according to claim 9, and alarm signalling means connected to the exterior of said hull for entry of sea water and also to the conduit connecting said delivery port to said sealing means, for signalling whenever the pressure of lubricant liquid delivered to said sealing means does not exceed the sea water pressure on the signalling means.

References Cited by the Examiner
UNITED STATES PATENTS

| | | | |
|---|---|---|---|
| 528,773 | 11/94 | Ellis | 277—3 |
| 2,466,025 | 4/49 | Hanson | 277—3 |
| 3,088,744 | 5/63 | Ezekiel et al. | 277—15 |

FOREIGN PATENTS

| | | |
|---|---|---|
| 324,763 | 2/30 | Great Britain. |

LEWIS J. LENNY, *Primary Examiner.*

SAMUEL ROTHBERG, EDWARD V. BENHAM,
*Examiners.*